May 24, 1949.　　　　L. C. MESKIMEN　　　　2,471,073
MOWER
Filed Oct. 16, 1945　　　　　　　　　　　　5 Sheets-Sheet 5
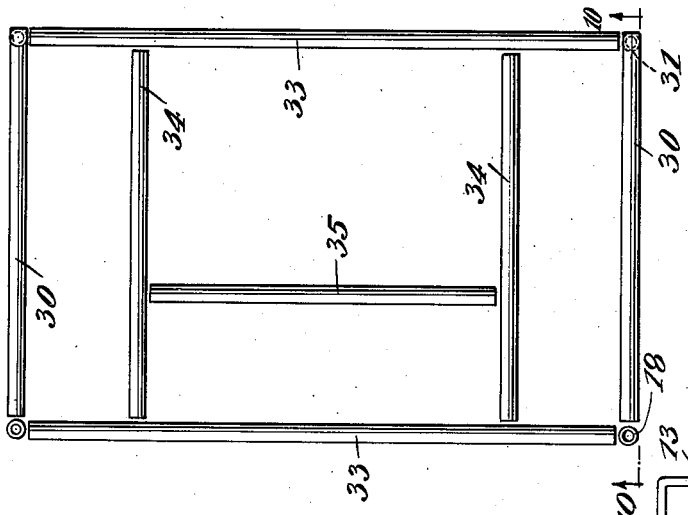
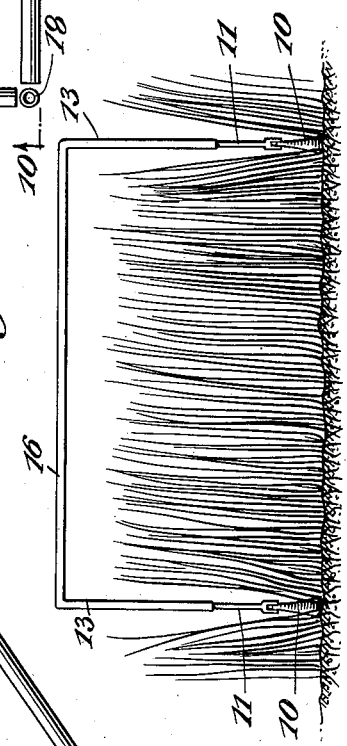
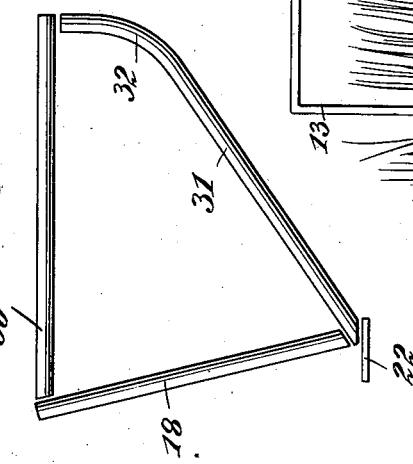
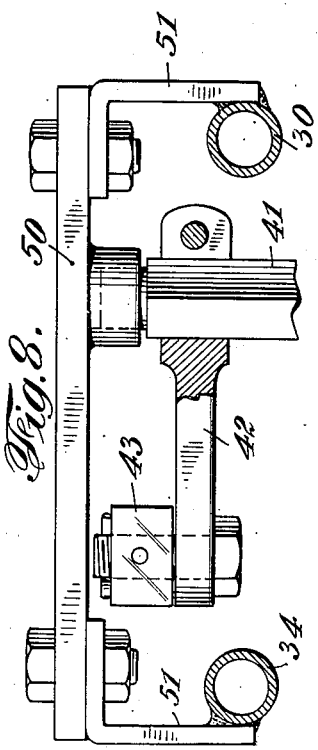
INVENTOR.
Leslie C. Meskimen
BY C. P. Goepel
his ATTORNEY Patented May 24, 1949

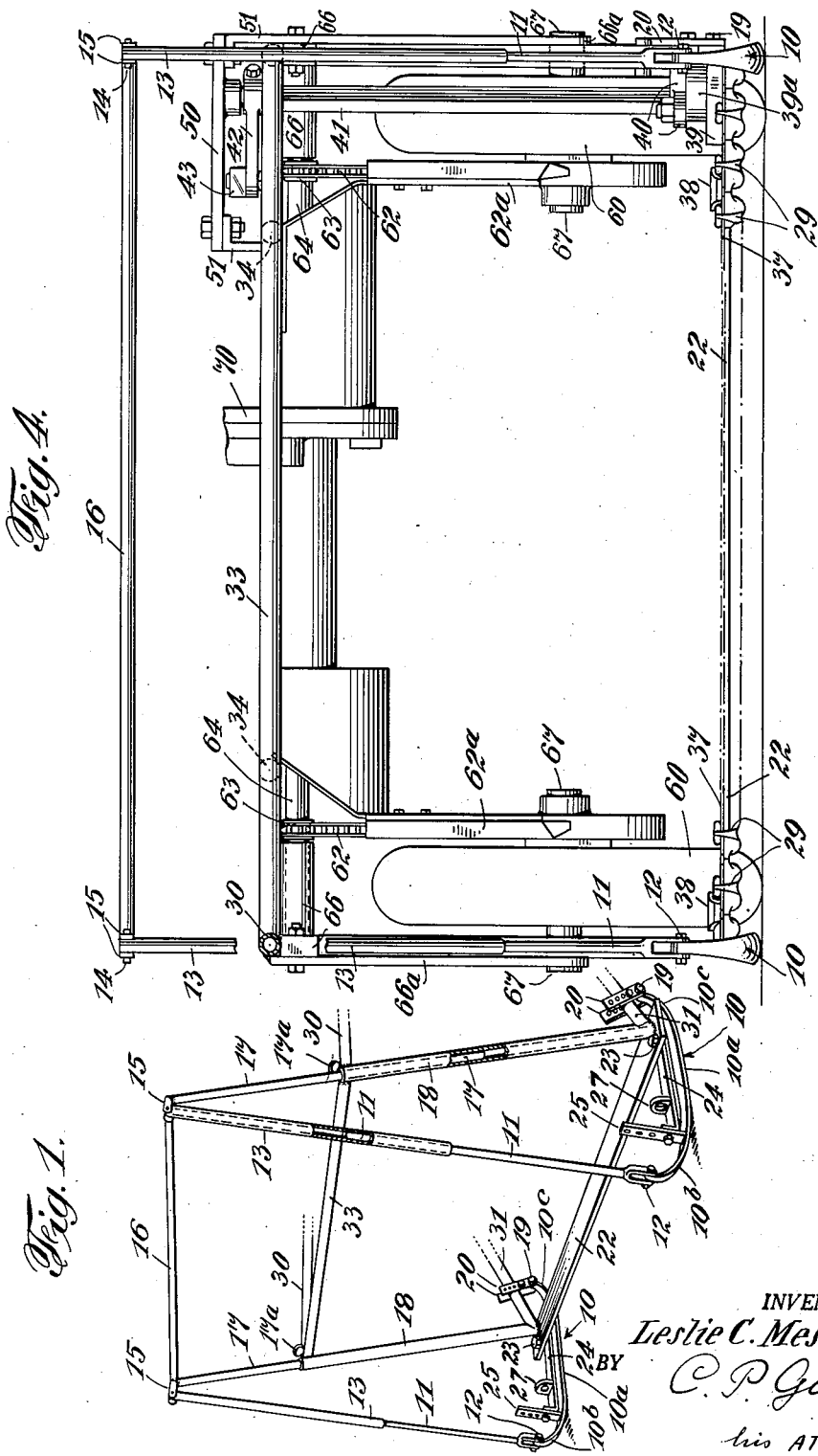

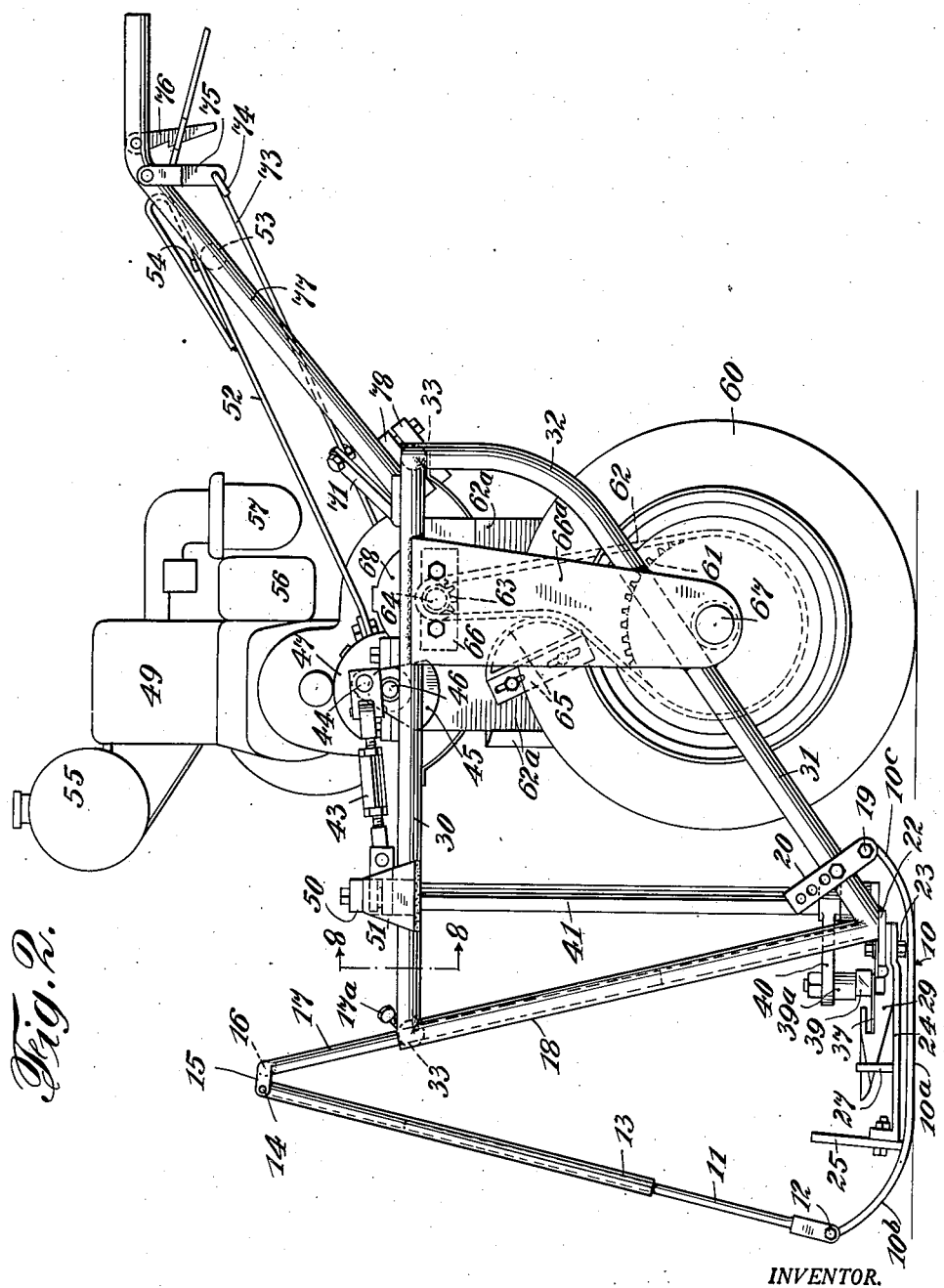

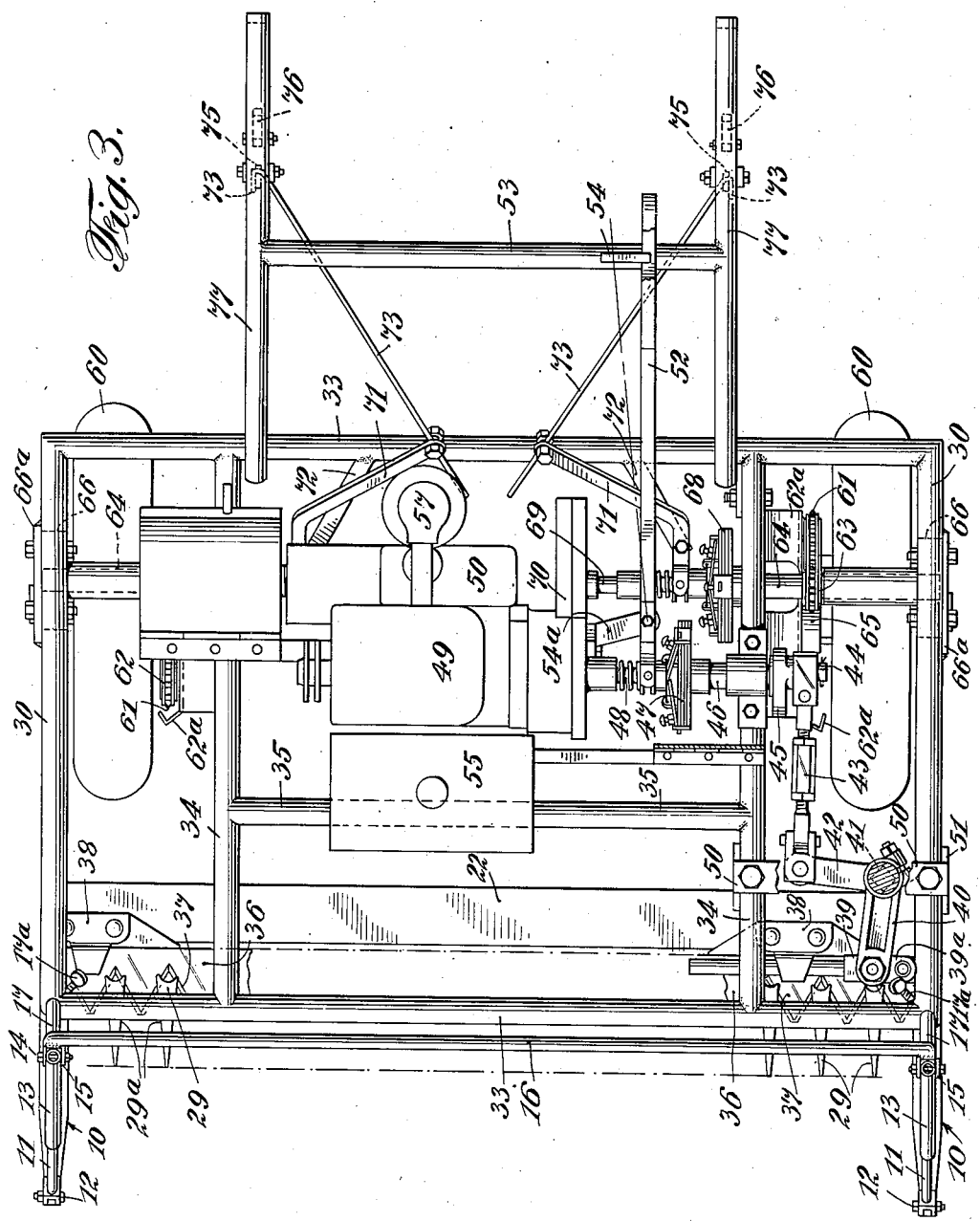

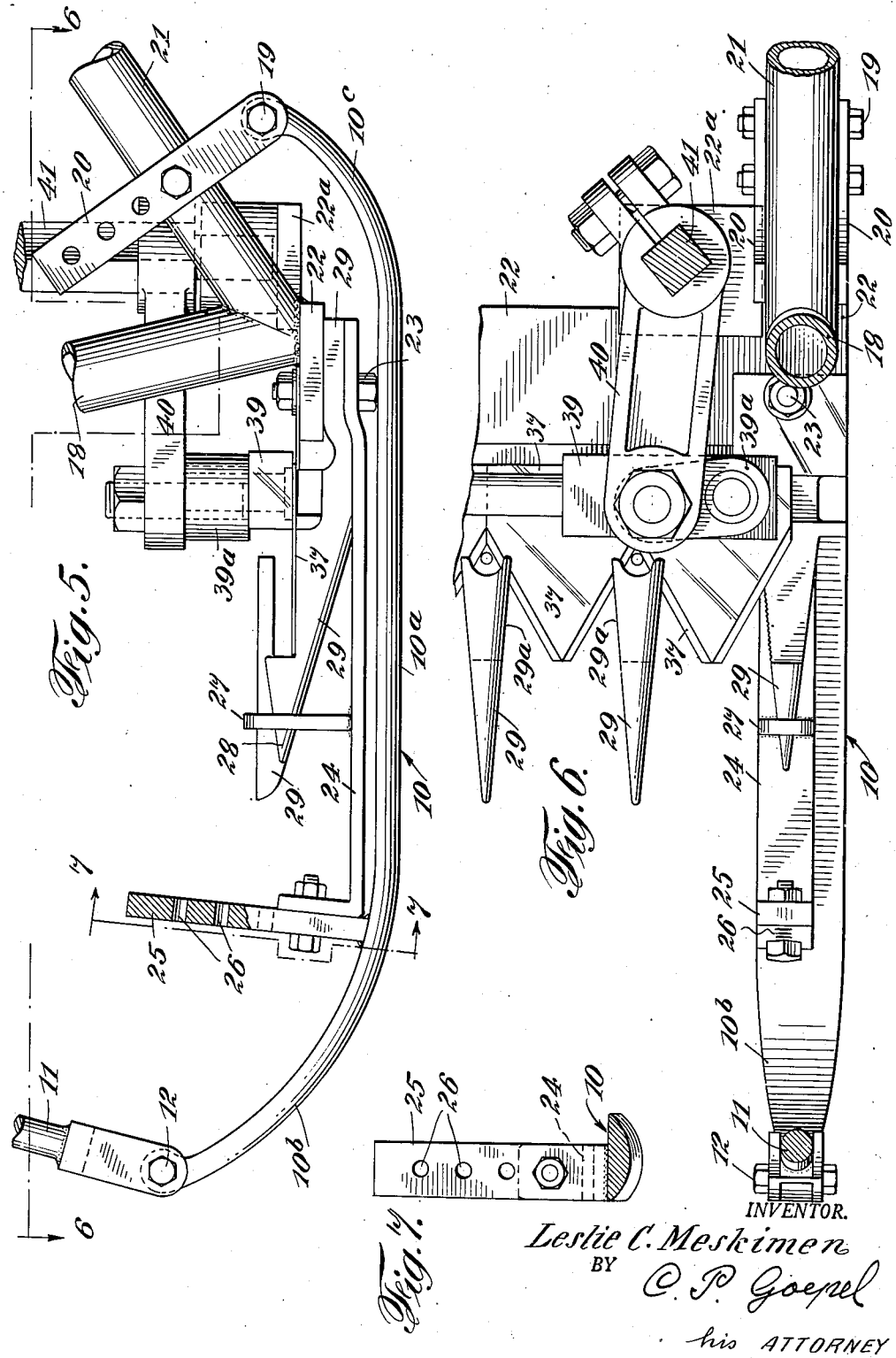

2,471,073

UNITED STATES PATENT OFFICE 2,471,073

MOWER

Leslie C. Meskimen, Shawnee on Delaware, Pa., assignor to Fairmont Railway Motors, Incorporated, Fairmont, Minn., a corporation of Minnesota Application October 16, 1945, Serial No. 622,501

3 Claims. (Cl. 56—26.5)

This invention relates to mowers, and more particularly to vegetation dividers for the same.

The object of the invention is to provide a vegetation divider which will divide from the vegetation to be cut, a path indicated by two parallel depressions between which the cutting mechanism can efficiently perform its work, so arranged as to prevent any vegetation from being bent so as to make the cutting difficult, and to prevent the vegetation from twisting around parts of the mower.

The invention consists in a vegetation divider having vegetation entering runners, connected with a front frame member and having dividing rods in advance of the runners, also connected with the frame of the mower, both rods and part of the runners being in advance of the vegetation cutting mechanism.

The invention includes means for adjusting the position of the runners, to enable them to be raised or lowered or present various angles to the ground, and thus present the cutting mechanism to the vegetation in different manners, to enable the operator to select the best form for any particular kind of vegetation.

The invention also includes an improved frame member, having a horizontal platform with depending vertical side frames, the front portion of which are connected by the aforesaid front frame member, the vertical frames being connected with the axle supporting members of the wheels, in proximity to the axles and the vertical side frames being arranged to resist the forces exerted upon the cutting mechanism.

The skeleton of the mower consists of a horizontal platform frame to support the motor, and parts actuated thereby as the clutches for the means to operate the wheels and for the means to operate the sickle knives. The vertical side frames of the platform frame, support the transverse frame member which in turn supports the cutting mechanism, vegetation divider, and a vertical rock shaft, the upper end of which is held by the platform frame.

The invention will be more fully described, embodiments shown in the drawings, and the invention will be pointed out finally in the claims.

In the accompanying drawings

Fig. 1 is a perspective view of the improved vegetation divider;

Fig. 2 is a side view of my improved mower;

Fig. 3 is a top view of the same,

Fig. 4 is a front elevation, upper parts omitted;

Fig. 5 is an enlarged side view of runner of the vegetation divider;

Fig. 6 is a sectional top view of the runner, taken on line 6—6 of Fig. 5;

Fig. 7 is a section of the runner, showing its curvature, taken on line 7—7 of Fig. 6;

Fig. 8 is an enlarged section taken on line 8—8 of Fig. 2;

Fig. 9 is a detail view of plan view of the platform frame;

Fig. 10 is an end view taken on line 10—10 of Fig. 9, and

Fig. 11 is a front of the vegetation divider, and showing its operation on vegetation.

Similar characters of reference indicate corresponding parts throughout the various views.

The improvement forming the basis of this application will be first pointed out.

Referring to Figs. 1, 3 and 4, the improved vegetation divider arranged at the front of the mower, consists of a pair of vegetation separators connected at their lower ends by a bottom front frame member, and by a transverse bar at their upper ends. The vegetation divider serves to mark out that portion of the vegetation which is to be cut by the sickle knives so as to obtain a clean cut without interference by any bent or twisted parts.

Each vegetation separator consists of a runner 10 which is intended to move along the ground, and which bears a considerable portion of the weight of the mower. The runner 10 is flat at 10a, and curved at its front 10b and at its rear 10c. At the front end of the runner, an upwardly inclined rod 11 is pivoted at 12. This rod 11 telescopes in a tube 13, which has its other end pivoted at 14 to curved forwardly extending short arms 15 of a horizontally disposed transverse bar 16. A rod 17 is secured, by welding or the like, to the bar 16, and this rod 17 telescopingly enters a tubular upright 18 of the frame of the mower.

The tube 13 with its rod 11 aligned therewith forms an angle with the rod 17, and these parts are in a vertical plane. The other separator is made of like parts and also in a vertical plane, and the two vertical planes are parallel with each other. The rod 16 is horizontal and connects these two separators at their upper portions. While the front rods 11 and tubes 13 are inclined rearwardly, and facilitate the entrance into the vegetation, they may be otherwise arranged than as shown in the embodiment. It is necessary to have each runner and its front rod extend in front of the sickle bar, and to have the runners connected with the lower portion of the frame to fully resist the thrust action when pushed into the vegetation.

The rear end of each runner 10 is adjustably connected by a bolt 19 to a perforated plate 20 which is secured to an inclined tubular frame member 31. The lower part of the upright 18 and the lower part of the frame member 31 are secured together preferably by welding. The joined lower portions are connected by a bottom front member 22, and so this front member 22 functions to connect the rear portions of the two runners 10. The front member 22 serves to connect the two runners 10, and thereby the separators in another manner. The member 22 has secured to it by bolts 23, one end of a bar 24, the other end of which is adjustably bolted to an upright 25 having spaced holes 26, which upright is preferably integral with the runner 10, by welding or the like.

The vegetation divider thus forms an entity, which has the transverse bar 16 with two angular disposed rods 17 at each side of the bar 16, one of which rods 17 at each side enters the tubular upright 18 and the other 11 is connected with the front end of the runner 10, to which the adjustment plate 20 and the upright 25 with its bar 24 is secured, the rear end of which bar 24 being bolted to the front member 22.

Thumb screws 17a are provided to lock rods 17 in the upright 18.

To complete the description of the bar 24, there is provided a guide post 27 having an opening, into which the front pointed end 28 of an end cutter guard, at each lateral end of the cutter bar 29, enters, this guide post 27, thus holding the runner 10 from lateral displacement. The cutter bar 29 is secured at its rear end to the front member 22 by means of the bolt 23. The rear end of the cutter bar 29 is intermediate the front member 22 and the rear end of the bar 24, the same bolt 23 holding these three parts together.

The mower to which this vegetation divider is applied is preferably the improved mower described and shown in my co-pending application Serial Number 508,479, filed November 1, 1943, now abandoned, and which will now be described as it embodies improvements over the earlier embodiment. This application is a continuation in part of my application Serial No. 508,479, filed November 1, 1943.

A platform frame is horizontally disposed and consists of two lateral members 30, which form the top members of lateral vertical frames, shown in Fig. 9. To the front end of each horizontal frame member 30, the inclined upright tubular side frame member 18 is secured, preferably by welding. To the rear of each horizontal frame member 30, a downwardly sloping inclined side frame member 31 is secured, the lower end of which is secured to the lower end of the upright 18, preferably by welding. The lower end of the inclined member 31 is cut at an angle to present a horizontal surface. The lower end of the upright 18 is cut at an angle to abut the inclined member 31, and is secured thereto by welding. To the lower end portions of the upright 18 and inclined member 31, the front frame member 22 is secured by welding. The upper portion of the inclined member 31 is curved as at 32. The upper end of the upright 18 is open to present its tubular opening to the entrance of the rods 17 of the vegetation divider.

Each end of each side frame horizontal member 30 has secured to it, one end of each of two parallel and spaced top front frame members 33, and these four frame members constitute generally the horizontal platform. To strengthen the same and provide special supports for the actuating parts, as the motor, etc., two intermediate longitudinal members 34, with an intermediate cross member 35 are provided having their ends secured by welding to the other frame members, as shown in Fig. 9.

In Figs. 9 and 10, the parts are shown spaced from each other, before they are secured together, for the sake of clarity, and to show the simplicity of the structural members, in the preferred embodiment.

The mower has then a skeleton made up of light seamless tubing consisting of the horizontal platform frame, with a lateral vertical frame at each side thereof, longitudinally disposed in respect to the mower, and the vertical frame being horizontally joined by the front member 22 arranged transversely to the vertical frames.

While this platform with its lateral vertical frames is, in the embodiment, shown as composed of separate unit members, it may be otherwise constructed, as for instance of a horizontal portion of sheet metal with depending vertical side portions of the configuration shown, and then provided with openings for the passage of the necessary actuating members. The lower front portions of the vertical side frames would then be connected by the member 22.

Disposed around this skeleton, are the actuating parts. The front frame member 22 supports the known cutter bar 29 with its inclined cutters 29a, cooperating with the known sickle bar 36 with its inclined sickle knives 37. These parts are well known and require no further description nor drawing, other than shown. Known clips 38 are disposed along the sickle bar to hold it in position against the cutter bar 29 to obtain the desired scissor or sickle action (Fig. 3).

However, the sickle bar 36 at one end thereof, has a bar 38 upon which is pivoted thereto a link 39a, the other end of which is pivoted to one end of a crank arm 40 movable in a horizontal plane by the rotation of a vertical square shaped rock shaft 41, the lower end of which rests upon an extended plate 22a of the front frame member 22. To the upper end of the rockshaft 41 another crank arm 42 movable in a horizontal plane is connected with an adjustable connecting rod 43, connected with a pin 44 on a rotating crank 45, the shaft 46 of which forms a part of the clutch 47, driven by the motor shaft 48 operated by a piston (not shown) in the cylinder 49. The upper end of the rock shaft 41 is held in position by a subsidiary frame consisting of a horizontal 50 and two verticals 51, the verticals 51 being secured to the frame members 30 and 34, the upper end of the rock shaft 41 being secured to the horizontal 50 (Fig. 8).

The clutch 47 is in or out, depending upon the position of clutch operating lever 52, which extends from the clutch 47 to the handle bar 53 (Fig. 3). The full line position shows the "off" position. The limit of movement of the lever 52 is determined by a bracket 54 on the bar 53. The lever 52 is supported on a bracket 54, to which it is pivoted. When the clutch 47 is in "in" position, the sickle bar 36 is moved transversely to and fro, and the cutting action takes place.

The known fuel reservoir 55, magneto 56, and carburator 57, cooperate with the cylinder 49 in the known manner.

Wheels 60 are each provided with a sprocket 61. A chain 62 passes over each sprocket and extends upwardly over a smaller sprocket 63 on a shaft 64. A known chain adjuster 65 is provided. A chain guard 62a is provided (Fig. 4).

Each shaft 64 has its outer end supported in a bearing block 66. This bearing block is bolted to a plate 66a, which extends downwardly to support each shaft 67 of the wheel 60. The upper end of each plate 66a is secured by welding to a horizontal frame member 30. Each plate 66a is connected with a sloping frame member 33 in proximity to the wheel shaft 67. By this arrangement, the side frames take up reaction forces acting against the wheels.

The shaft 64 is connected with a clutch 68, which in turn is connected with a motor driven shaft 69. Suitable gearing (not shown) in a casing 70, connects the shaft 69 with the motor shaft 48. The clutch 68 is actuated to in or out position by a rod 71 pivoted to a bracket 72 (Fig. 3). The rod 71 is moved by a rod 73 extending to one of the handles, as at 74, where it is looped to a pivoted bracket 75, which may be held in position by a pivoted dog 76. (Fig. 2).

Each of the wheels 60 is rotated by a separate actuating mechanism as described; and separate clutch operating rods 73 extend to the handles 77, in order that either wheel may be rotated separately, or both together.

The handles 77 are secured to the top frame platform, by bolted members 78 clamped to the rear transverse frame member 33.

From the foregoing, it is seen that the essential feature is the member 22 around which the vegetation divider and the frame of the mower centers, in that, this member connects the two vegetation separators and thus forms the vegetation divider, and in that, it connects the front portions of the two vertical side frames and supports the sickle knives and cutters in a thrust reacting manner, these cutting mechanisms and the divider, being subjected to reaction forces when encountering and cutting the vegetation.

I have described several forms of my invention, but obviously various changes may be made in the details disclosed without departing from the spirit of the invention as set out in the following claims.

I claim:

1. In a motor actuated, wheel type, sickle bar mower having a motor, actuating means from the motor to the sickle bar, a platform for the motor, ground wheel supports intermediate the front and rear of said platform extending downwardly therefrom, stub axles on said supports, and a ground wheel for each axle, the combination of a transverse front bar for supporting the sickle bar, and a pair of vertical spaced parallel frames one at each end of the transverse front bar, each frame being exterior to a ground wheel, and each consisting of a horizontally disposed side bar forming the side of the platform, a substantially vertical bar extending downwardly from the front end of the horizontal side bar to a lateral end of the front bar, and a second bar extending downwardly and forwardly from the rear of the horizontal side bar to the lower end of the vertical bar and connected therto, each juncture of the lower ends of the vertical and second bars being connected with the lateral end of the front bar, and each second bar intermediate its length secured to the wheel support in proximity to the wheel axle.

2. In a motor actuated, wheel type, sickle bar mower having a motor, actuating means from the motor to the sickle bar, a platform for the motor, ground wheel supports intermediate the front and rear of said platform extending downwardly therefrom, stub axles on said supports, and a ground wheel for each axle, the combination of a transverse front bar for supportng the sickle bar, and a pair of vertical spaced parallel frames one at each end of the transverse front bar, each frame being exterior to a ground wheel, and each consisting of a horizontally disposed side bar forming the side of the platform, a substantially vertical bar extending downwardly from the front end of the horizontal side bar to a lateral end of the front bar, and a second bar extending downwardly and forwardly from the rear of the horizontal side bar to the lower end of the vertical bar and connected thereto, each juncture of the lower ends of the vertical and second bars being connected with the lateral end of the front bar, and each second bar intermediate its length secured to the wheel support in proximity to the wheel axle, said sloping bar between its attachment to the ground wheel frames and to the horizontal side bar being curved with an outward convex and inner concave contour.

3. In a motor actuated, walk type, sickle bar mower having a horizontally disposed frame for supporting a motor, actuating means extending from the motor to the sickle bar having end cutter guards and ground wheels, the combination of a pair of spaced lateral vertical frames below said horizontal frame, a front member disposed between the front portions of said lateral vertical frames for supporting the sickle bar and the movable cutting mechanism cooperating with the sickle bar, and a pair of vegetation dividers, each having one end connected with the front portion of each lateral vertical frame, and having a part extending forwardly of the frame in an inclined position to the perpendicular to act as a divider of the vegetation, and a second part extending downwardly and rearwardly and from the front of to below the front member and to the rear thereof and connected with the front member, said second part forming a runner for supporting the front of the frame of the mower, a guide post extending upwardly from the runner engaging a front end of an outer cutter guard for holding the runner against lateral movement, and means adjusting the position of the runner toward or away from the front member.

LESLIE C. MESKIMEN.

REFERENCES CITED

The following references are of record in the file of this patent:

UNITED STATES PATENTS

| Number | Name | Date |
|---|---|---|
| 998,526 | Karst | July 18, 1911 |
| 2,374,533 | Fulton | Apr. 24, 1945 |

FOREIGN PATENTS

| Number | Country | Date |
|---|---|---|
| 754 490 | France | Aug. 28, 1933 |